March 2, 1971  R. O. BOCK ET AL  3,566,692
APPARATUS FOR MEASURING ACCELERATIONS, ESPECIALLY THE
ACCELERATION OF GRAVITY
Filed Dec. 27, 1967
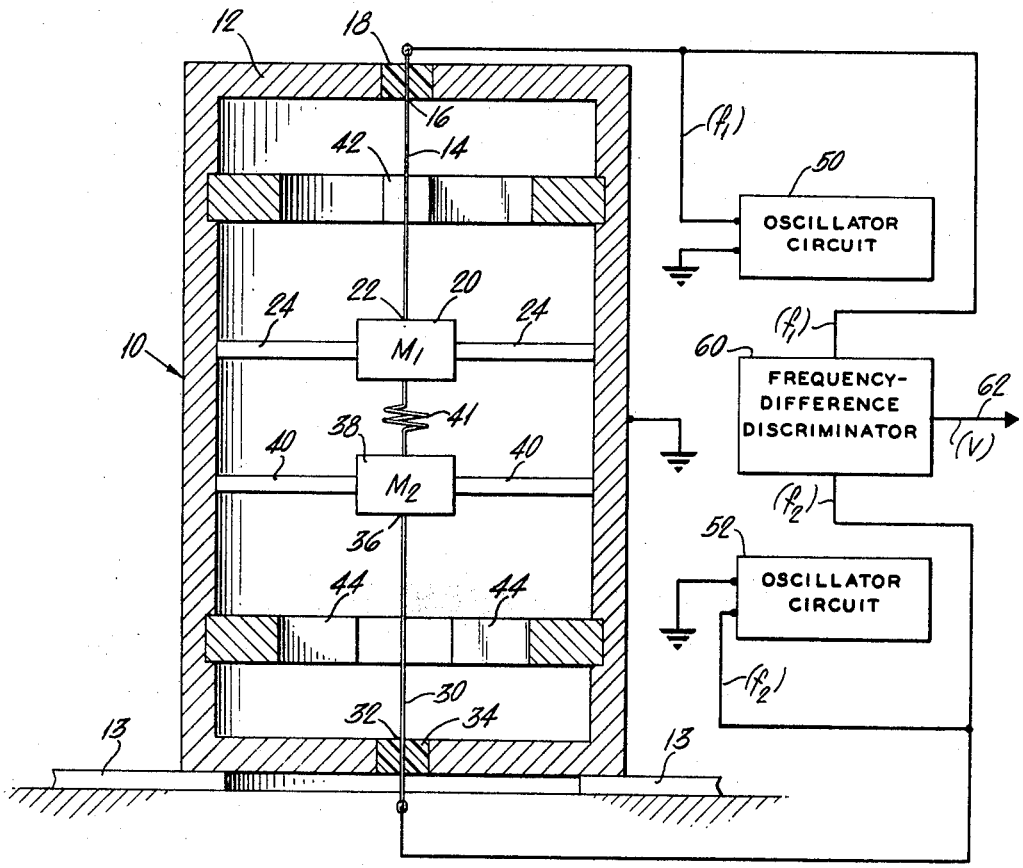
INVENTORS:
ROBERT O. BOCK
CHARLES D. BOCK
BY
Howson & Howson
ATTYS.

United States Patent Office

3,566,692
Patented Mar. 2, 1971

3,566,692
APPARATUS FOR MEASURING ACCELERATIONS, ESPECIALLY THE ACCELERATION OF GRAVITY
Robert O. Bock, Garden City, and Charles D. Bock, Plainview, N.Y., assignors to AMBAC Industries, Incorporated, Garden City, N.Y.
Filed Dec. 27, 1967, Ser. No. 693,837
Int. Cl. G01v 7/00
U.S. Cl. 73—382          5 Claims

ABSTRACT OF THE DISCLOSURE

A vibrating-string type of gravimeter comprising a pair of proof-mass elements connected together by a spring, and a pair of vibrating strings each stretched between a different one of the proof-mass elements and the supporting frame. Preferably the two strings are identical, but the linearity of response of the gravimeter is improved by using values for the masses $M_1$ and $M_2$ of the two proof-mass elements which differ from each other, typically by several percent, substantially in accordance with the relationship:

$$M_1 = \left[\frac{T_0 + M_1 g_0 + K}{T_0 - M_2 g_0 + K}\right]^{3/4} M_2$$

$T_0$ = the tension in both of said strings in the absence of net acceleration acting along the direction of the length of said strings,
$g_0$ = a fixed reference value of the acceleration of gravity, and $$K = \frac{EI}{l^2}, \text{ where}$$

$E$ = elastic constant of said strings,
$I$ = section modules, and
$l$ = length of each string.

BACKGROUND OF THE INVENTION

Devices for measuring accelerations are variously known as accelerometers or gravimeters depending on the use to which they are put, the latter term commonly being utilized where the acceleration to be measured is the acceleration of gravity $g$. One known type of accelerometer suitable for use in inertial guidance systems utilizes as the indication of acceleration the difference in natural vibration frequency of a pair of vibrating strings which are tensioned by securing one end of each of the strings to different spaced points on a supporting frame and connecting the other, adjacent ends of the strings to two different, spaced proof-mass elements joined by a string. Apparatus of this general class and various preferred features thereof are described and claimed in U.S. Pat. No. 3,332,290 of Charles D. Bock et al., issued July 25, 1967; in copending U.S. patent application Ser. No. 313,705, of Gareth M. Davidson et al., filed Oct. 3, 1963, now Patent No. 3,464,255; and in copending U.S. patent application Ser. No. 313,704 of Charles D. Bock et al., filed Oct. 3, 1963, now Pat. No. 3,382,723. In such devices the difference in vibration frequency inherently tends to be a non-linear function of the acceleration affecting the proof-mass elements, and accordingly certain special forms of linearizing circuitry have generally been necessary when linear response is desired. Where such a device utilizing two vibrating strings and two proof-mass elements is utilized as a gravimeter, the same type of non-linearity between difference frequency and acceleration of gravity arises. Such non-linearity is generally undesirable for a number of reasons; for example, where the gravimeter is used on a ship and is to provide very accurate measurements, it is much easier to eliminate the effects of ship motion on the gravimeter when the gravimeter response is linear. Linearity also enables easier calibration of the instrument.

Accordingly it is an object of the invention to provide a new and useful apparatus for measuring accelerations.

Another object is to provide a gravimeter of a type utilizing a pair of vibrating string members, in which variations in the difference in frequency of vibration of the two strings is substantially linearly proportional to changes in the value of the acceleration of gravity at the apparatus.

Another object is to provide such apparatus which is reliable and stable, yet relatively simple.

SUMMARY OF THE INVENTION

In accordance with the invention, these and other objects of the invention are achieved by the provision of an improvement in apparatus for measuring accelerations of the type employing a first proof-mass element, a second proof-mass element, a support frame having two spaced-apart support points thereon, a first vibrating-string member connecting said first proof-mass element to one of said support points, a second vibrating-string member connecting said second proof-mass element to the other of the support points, resilient connecting means connecting together said first and second proof-mass elements whereby said members are subjected to tensions dependent upon the net acceleration acting on said proof-mass elements along the direction of the length of said members, and means for sensing the difference in the natural vibration frequencies $f_1$ and $f_2$ of said first and second vibrating-string members, respectively. In accordance with the improvement of this invention, the combination of the first vibrating-string member and the first proof-mass element differ substantially from the combination of the second vibrating-string member and the second proof-mass element in such manner that the greatest linearity of the function relating the difference frequency $(f_1-f_2)$ to said net acceleration occurs at a reference value $a_0$ of said net acceleration differing substantially from zero. Accordingly, the desired linearity of response can be obtained when measuring accelerations near the reference value $a_0$.

More particularly, as will be demonstrated hereinafter, the parameters of the first and second combinations of vibrating-string member and proof-mass element are selected substantially in accordance with the relationship:

$$M_1 = M_2 \left(\frac{B_1}{B_2}\right)^{3/4} \left(\frac{m_1 l_1}{m_2 l_2}\right)^{1/4}$$

where the symbols have the meanings defined hereinafter in the specification and in the claims.

For reasons indicated hereinafter, preferably $m_1 l_1$ equals $m_2 l_2$, so that the desired relationship is then produced by selecting $M_1 = M_2 (B_1/B_2)^{3/4}$. As will also be shown hereinafter, in the case of a gravimeter designed to measure relatively small percentage variations of the acceleration of gravity $g$ from a reference value $g_0$, the desired relationship between $M_1$ and $M_2$ is satisfied to a close approximation by the relationship:

$$M_1 = \left[\frac{T_0 + M_1 g_0 + K}{T_0 - M_2 g_0 + K}\right]^{3/4} M_2$$

where the symbols have the meanings set forth hereinafter. Typically in gravimeter applications the difference in masses $M_1$ and $M_2$ in accordance with the last equation is of the order of several percent to obtain the desired linear relationship between $g$ and $(f_1-f_2)$.

BRIEF DESCRIPTION OF FIGURES

These and other objects and features of the invention will be more readily understood from a consideration of the following detailed description taken in connection with the accompanying drawings, in which the figure is a schematic representation of gravimeter apparatus and circuitry embodying the invention.

DESCRIPTION OF PREFERRED EMBODIMENT

Referring to the embodiment of the invention illustrated in FIG. 1 by way of example only, the gravimeter apparatus indicated generally by numeral 10 comprises an outer cylindrical supporting frame 12 mounted on a horizontal supporting surface 13 with its cylindrical axis vertical. The frame 12 may be of metal and connected to a reference potential designated as ground. A first vibrating-string member 14 is secured at point 16 to the upper end of support frame 12. Preferably the portion of the frame connected to the member 14 is electrically insulating; for this purpose a plug 18 of insulating material may be mounted at the center of the upper end of frame 12, through which plug the member 14 extends to the exterior. The opposite end of member 14 is secured to the upper surface of proof-mass element 20 at point 22. Proof-mass element 20 may be secured against motions transverse to the axis of support frame 12 by means of lateral supports or tapes such as 24, connected between the sides of proof-mass element 20 and adjacent portions of the supporting frame, in well-known manner.

Similarly, a second vibrating-string member 30 is connected to the lower end of frame 12 at a point 32 of insulating plug 34, and extends therethrough to the exterior of the frame. The upper end of member 30 is secured to a point 36 on the lower side of proof-mass element 38, which is stabilized against lateral motion by means of tapes such as 40.

A coil spring 41 is secured to the lower surface of proof-mass element 20 and to the upper surface of proof-mass element 38. It will be understood that the assembly of members 14 and 30, proof-mass elements 20 and 38 and spring 42 are pretensioned in frame 12. The spring 41 is preferably sufficiently soft or resilient that it operates within its linear range for all positions of the proof-mass elements during operation.

The vibrating-string members 14 and 30 are preferably, but not necessarily, identical with each other, and may have a variety of forms well known in the prior art, such as wires of circular cross-section or thin ribbons of essentially rectangular cross-section having their planes at right angles to each other. In the present case it will be assumed that metal tapes are used, with their lengths axially aligned with each other and their cross-sectional axes at right angles to each other.

Opposite poles of a magnet 42 are placed on opposite sides of the center of the length of the member 14, the magnet being mounted from the supporting frame. Similarly, another magnet 44 is mounted with its opposite poles on opposite sides of the center of the length of member 30, but with its poles rotated about member 30 by 90° with respect to magnet 42.

The vibrating-string members are electrically insulated from each other, but the ends of these members adjacent their respective proof-mass elements are connected to the grounded frame in known manner, as by fine hair-like wires or by use of conducting support tapes.

String member 14 is maintained in vibration at its natural frequency by means of the oscillator circuit 50, which operates to pass an alternating current through string member 14, the frequency of the alternating current and the frequency of vibration of the string member 14 being dependent upon the tension produced in the member 14 during operation. The frequency of vibration of the upper string member 14 will be designated hereinafter as $f_1$. Similarly, the oscillator circuit 52 passes an alternating current through the lower string member 30 to cause it to vibrate at its natural frequency, which is designated hereinafter as $f_2$ and is dependent upon the tension of the lower string member. Signals from oscillator circuit 50 and oscillator circuit 52, at frequencies $f_1$ and $f_2$, respectively, are supplied to frequency-difference discriminator 60 which may be of conventional form and operates to produce at its output lead 62 a voltage proportional to the frequency difference $(f_1-f_2)$.

The apparatus thus far described, when constructed in accordance with prior art teachings so that string members 14 and 30 are proof-mass elements 20 and 38 are identical with each other within about 0.1%, results in an output voltage V which has its greatest linearity near zero acceleration. The above-described patent describes one method for improving the linearity in a manner suitable for some accelerometer applications, involving relatively complex circuitry for automatically maintaining the sum of the natural vibration frequencies at a constant value. The present invention requires no such special external circuitry, but instead provides a special relationship between the characteristics of the various parts of the accelerometer or gravimeter which produces a high degree of linearity for small deviations on either side of a given reference value $a_0$ of acceleration near which the instrument is to operate. For example, when the apparatus is used as a gravimeter, the reference acceleration $a_0$ is a reference value of the acceleration of gravity $g_0$, and the measured values of $g$ will be within a relatively narrow range of deviation about the reference value $g_0$. While the desired linearization in the region of the acceleration $a_0$ can be obtained by selection of the values of any of a number of parameters of the apparatus in accordance with the invention, it is preferred to achieve the desired linearity by an unbalance or difference in the masses of the two proof-mass elements 20 and 38.

The selection of the values of the parameters used, and the reasons for their selection, will be more fully appreciated from a consideration of the following analysis.

The classical formula for the vibration frequency $f$ of a string is:

$$f=\frac{1}{2}\left[\frac{T_0 \pm M_a}{ml}+\frac{EI}{ml^3}\right]^{1/2} \quad (1)$$

(the use of $+$ or $-$ depending on the sense of the acceleration $a$), where:

$T_0$=initial tension in string, in the absence of net acceleration components along the string
$M$=mass of proof-mass element acting on string
$a$=acceleration input (e.g. sum of acceleration of frame and acceleration of gravity acting on proof-mass element along direction of string)
$m$=mass per unit length of string
$l$=length of string
$I$=section modulus
$E$=elastic constant of string Equation 1 may be re-written as:

$$f=\frac{1}{2}\left[\frac{T_0+K \pm M_a}{Ml}\right]^{1/2} \quad (2)$$

where:

$$K=\frac{EI}{l^2}$$

Now $a=a_0+c$ \quad (3)

where $a_0$ is a fixed reference value of $a$, and $c$ is the deviation $(a-a_0)$ of $a$ from the reference value $a_0$.

Substituting Equation 3 in Equation 2 gives:

$$f=\frac{1}{2}\left[\frac{T_0+K \pm Ma_0+Mc}{ml}\right]^{1/2} \quad (4)$$

For convenience, let B represent $T_0+K \pm Ma_0$. \quad (5)

Equation 4 may then be written as:

$$f=\frac{1}{2}\left[\frac{B+Mc}{ml}\right]^{1/2} \quad (6)$$

or $$f = \frac{1}{2}\left[\frac{B}{ml}\right]^{1/2}\left[1 + \frac{Mc}{B}\right]^{1/2} \quad (7)$$

By mathematical expansion, Equation 7 becomes:

$$f = \frac{1}{2}\left[\frac{B}{ml}\right]^{1/2}\left[1 + \frac{1}{2}\frac{Mc}{B} - \frac{1}{8}\left(\frac{Mc}{B}\right)^2 + \frac{1}{16}\left(\frac{Mc}{B}\right)^3 + \cdots\right] \quad (8)$$

In the apparatus of FIG. 1, the relation of Equation 8 is separately applicable to string 14 and proof-mass element 20, and to string 30 and proof-mass element 38, so long as both strings are taut.

Accordingly, designating parameters of the upper string 14 by subscripts 1 and those of the lower string 30 by subscript 2, $$f_1 = \frac{1}{2}\left[\frac{B_1}{ml_1}\right]^{1/2}\left[1 + \frac{1}{2}\frac{M_1c}{B_1} - \frac{1}{8}\left(\frac{M_1c}{B_1}\right)^2 + \frac{1}{16}\left(\frac{M_1c}{B_1}\right)^3 + \cdots\right] \quad (9)$$

$$f_2 = \frac{1}{2}\left[\frac{B_2}{m_2l_2}\right]^{1/2}\left[1 - \frac{1}{2}\frac{M_2c}{B_2} - \frac{1}{8}\left(\frac{M_2c}{B_2}\right)^2 - \frac{1}{16}\left(\frac{M_2c}{B_2}\right)^3 + \cdots\right] \quad (10)$$

where:

$$B_1 = T_0 + K + M_1a_0 \text{ and } K_1 = \frac{E_1I_1}{l_1^2} \quad (11)$$

$$B_2 = T_0 + K_2 - M_2a_0 \text{ and } K_2 = \frac{E_2I_1}{l_2^2} \quad (12)$$

The frequency difference $(f_1-f_2)$ is therefore obtained by subtracting Equation 10 from Equation 9 term by term. It will be appreciated that the quantities B, M, $m$ and $l$ are all constants for a given equipment. Accordingly, the difference between the first terms of the expansions in Equations 9 and 10 is a constant, the difference between the second terms is a quantity linearly proportional to $c$, and the differences between the remaining higher-order terms are non-linear functions of $c$.

However, the higher-power terms of the expansion become progressively smaller and less significant when $c$ is small compared with $a_0$. This is due not so much to the progressively smaller value of the numerical coefficients of the terms but primarily because the factor $Mc/B$ is a fraction substantially less than one. More particularly, $Mc/B = Mc/(T_0+K+Ma_0)$ and hence $Mc/B$ is always smaller than $c/a_0$. If for example $c$ is at most 10% of $a_0$, then $Mc/B$ is less than .1. The square term is therefore less than .01, the cube term less than .001, etc. While the square term is therefore 10% of the linear term, the cube term is only 1% of the linear term. Hence if the square term is eliminated, the departure of $(f_1-f_2)$ from linearity for 10% deviations from $a_0$ will be less than 1%, representing a high degree of linearity.

The invention accomplishes elimination of the square term by utilizing apparatus such that coefficients of the corresponding square terms of the above series expansions in Equations 9 and 10 are equal, i.e. so that $$\left(\frac{B_1}{m_1l_1}\right)^{1/2}\frac{M_1^2}{B_1^2} = \left(\frac{B_2}{m_2l_2}\right)^{1/2}\frac{M_2^2}{B_2^2} \quad (13)$$

or, $$M_1 = M_2\left(\frac{B_1}{B_2}\right)^{3/4}\left(\frac{m_1l_1}{m_2l_2}\right)^{1/4} \quad (14)$$

Substituting for $B_1$ and $B_2$ gives:

$$M_1 = M_2\left(\frac{T_0+K_1+M_1a_0}{T_0+K_2-M_2a_0}\right)^{3/4}\left(\frac{m_1l_1}{m_2l_2}\right)^{1/4} \quad (15)$$

The relationship of Equation 15 can be satisfied by any of a large number of combinations of values of $m$, $l$, $K$, $T_0$, $M_1$ and $M_2$ for a given value of $a_0$. However, in the preferred embodiment the two strings are preferably substantially identical to minimize errors due to temperature variations, so that $m_1=m_2$, $l_1=l_2$ and $K_1=K_2=K$. Equation 15 then becomes $$M_1 = M_2\left(\frac{T_0+K+M_1a_0}{T_1+K-M_2a_0}\right)^{3/4} = M_2\left(\frac{B_1}{B_2}\right)^{3/4} \quad (16)$$

Where the apparatus is to be used as a gravimeter, $a_0$ is preferably made equal to a standard value $g_0$ of the acceleration of gravity, so that Equation 16 then becomes $$M_1 = M_2\left[\frac{T_0+K+M_1g_0}{T_0+K-M_2g_0}\right]^{3/4} = M_2\left(\frac{B_1}{B_2}\right)^{3/4} \quad (17)$$

The condition that the strings remain taut over the range of measurement means that $T_0+K$ is larger than $M_1g$ and $M_2g$, so that the quantity in parenthesis in Equation 17 is never negative.

From Equation 17 the desired ratio $M_1/M_2$ can be obtained by the method of successive approximations.

Without thereby in any way limiting the scope of the invention, the following is an example of one specific application thereof.

Assume first that $M=M_1=M_2=4.988\pm.002$ grams, $T_0=340.2$ grams, and $K=0.015\ T_0$. Then $T_0+K+M=350.29$ grams (approximately$=B_1$)
$T_0+K-M=340.31$ grams (approximately$=B_2$)

and $$B_1/B_2 = \frac{350.29}{340.31} = 1.0293$$

from Equation 17, $M_1=1.0190\ M_2$ (first approximation).

Repeating this calculation using $M_1=1.0190\ (4.988)$, gives $M_1 = 1.02215\ M_2$ (second approximation)

Repeating the calculation for a third time shows no significant change in $M_1/M_2$, hence the values obtained from the second approximation is adequate. Thus in this example, $M_1$ is made about 2.2% larger than $M_2$.

In another example in which the scale factor of the instrument is expanded by a factor of about 10 times, so that $T_0$ is about 6 mg., the method of successive approximations gives $M_1=1.3330\ M_2$, representing a difference of about 33% in the masses $M_1$ and $M_2$.

It will be understood that, following the teachings of the invention, appropriate values for the unbalanced gravimeter or accelerometer may be found by experimental variation of the parameters coupled with observations of the response of the instrument to applied accelerations.

When an instrument constructed in accordance with the invention is used as a gravimeter on a ship subject to heaving motion, the improved linearity obtained about the desired acceleration value facilitates averaging-out of errors in measurement due to the accelerations of the instrumest produced by the heaving motion.

While the invention has been described with particular reference to specific embodiments thereof in the interest of complete definiteness, it will be understood that it may be embodied in a variety of other forms without departing from the scope of the invention as defined by the appended claims.

We claim:

1. In apparatus for measuring accelerations, comprising a first proof-mass element, a second proof-mass element, a support frame having two spaced-apart support points thereon, a first vibrating-string member connecting said first proof-mass element to one of said support points, a second vibrating-string member connecting said second proof-mass element to the other of said support points, resilient connecting means interconnecting said first and second proof-mass elements whereby said members are subjected to tensions dependent upon the net acceleration acting on said proof-mass elements along the direction of the length of said string members, said support points being so located that the tensions in said first and second string members change in opposite senses in response to changes in acceleration applied to said frame, and means for sensing the difference in natural vibration frequencies $f_1$ and $f_2$ of said first and second vibrating-string members, respectively, the improvement wherein the combination of said first vibrating-string member and said first proof-mass element differs substantially from the combination of said second vibrating-string member and said second proof-mass element with respect to one or more of the parameters $m$, $l$, $E$, $I$, $T_0$ and $M$, where $m$ is mass per unit length of string member, $l$ is the length of string member, $E$ is the string elastic constant, $I$ is the string section modulus, $T_0$ is the string tension in the absence of net acceleration components along the string and $M$ is the mass of proof-mass elements, whereby the greatest linearity of the function relating the difference frequency ($f_1 - f_2$) to said net acceleration occurs at a value of said net acceleration differing substantially from zero, said first combination and said second combination being constituted substantially to satisfy the following relationship:

$$M_1 = M_2 \left(\frac{B_1}{B_2}\right)^{3/4} \left(\frac{m_1 l_1}{m_2 l_2}\right)^{1/4}$$

where:

$M_1$ and $M_2$ are the masses of said first and second proof-mass elements, respectively;

$m_1$ and $m_2$ are the mass per unit length of said first and second vibrating-string members, respectively;

$l_1$ and $l_2$ are the lengths of said first and second vibrating-string members, respectively;

$B_1 = T_0 + K_1 + M_1 a_0$;
$B_2 = T_0 + K_2 - M_2 a_0$;
$T_0$ = tenson in both of said vibrating-string members in the absence of net force components acting on said proof-masses along the direction of the lengths of said vibrating-string members;

$$K_1 = \frac{E_1 I_1}{l_1^2}$$

$$K_2 = \frac{E^2 I^2}{l_2^2}$$

$E_1$ and $E_2$ are the elastic constants for said first and second string members, respectively;

$I_1$ and $I_2$ are the section moduli for said first and second string members, respectively; and $a_0$ is a fixed reference value of said acceleration differing substantially from zero.

2. The apparatus of claim 1, wherein said mass per unit length and the length of said first vibrating-string member are substantially equal to the mass per unit length and the length, respectively, of said second vibrating-string member and said masses $M_1$ and $M_2$ differ substantially from each other.

3. The apparatus of claim 2, in which said value $a_0$ is substantially equal to a fixed reference value $g_0$ of the acceleration of gravity near the surface of the earth.

4. In apparatus for measuring the acceleration of gravity, comprising a first proof-mass element, a second proof-mass element, a support frame having two spaced-apart support points thereon, a first vibrating-string member connecting said first proof-mass element to one of said support points, a second vibrating-string member connecting said second proof-mass element to the other of said support points and substantially identical to said first member in length, in elastic constant and in mass, resilient connecting means connecting together said first and second proof-mass elements to suspend said members under tension, whereby said members are subjected to tensions which vary in opposite senses in response to changes in the net acceleration acting on said proof-mass elements along the direction of the lengths of said members, and means for sensing the difference in natural vibration frequency of said members:

the improvement wherein the masses $M_1$ and $M_2$ of said first and second proof-mass elements, respectively, differ from each other substantially according to the relationship:

$$M_1 = \left[\frac{T_0 + M_1 g_0 + K}{T_0 - M_2 g_0 + K}\right]^{3/4} M_2$$

where $T_0$ = the tension in both of said members in the absence of components of acceleration acting thereon along the direction of the length of said members;
$g_0$ = a fixed reference value of the acceleration of gravity and $$K = \frac{EI}{l2}$$

where:

$E$ = elastic constant of said members
$I$ = section modulus and
$l$ = length of each of said members.

5. Apparatus in accordance with claim 4, in which said masses $M_1$ and $M_2$ differ from each other by several percent.

References Cited

UNITED STATES PATENTS

| | | | |
|---|---|---|---|
| 2,968,950 | 1/1961 | Dunbar et al. | 73—517AVX |
| 3,434,352 | 3/1969 | Jewell et al. | 73—517AV |
| 3,002,391 | 10/1961 | Holmes | 73—517AV |
| 3,057,208 | 10/1962 | Bedford | 73—517AV |

JAMES J. GILL, Primary Examiner

U.S. Cl. X.R.

73—517